US012710911B2

(12) United States Patent
Agrawal et al.

(10) Patent No.: US 12,710,911 B2
(45) Date of Patent: Aug. 18, 2026

(54) EXTENDED REALITY CONTENT DISPLAY BASED ON A CONTEXT

(71) Applicant: Taiwan Semiconductor Manufacturing Company, Ltd., Hsinchu (TW)

(72) Inventors: Tushar Agrawal, West Fargo, ND (US); Christian Compton, Austin, TX (US); Jeremy R. Fox, Georgetown, TX (US); Sarbajit K. Rakshit, Kolkata (IN)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 34 days.

(21) Appl. No.: 18/187,415

(22) Filed: Mar. 21, 2023

(65) Prior Publication Data

US 2024/0319951 A1 Sep. 26, 2024

(51) Int. Cl.

| | |
|---|---|
| ***G06F 3/14*** | (2006.01) |
| ***G06F 3/01*** | (2006.01) |
| ***G06F 21/62*** | (2013.01) |
| ***G06T 19/00*** | (2011.01) |

(52) U.S. Cl.

CPC ............ *G06F 3/1454* (2013.01); *G06F 3/011* (2013.01); *G06F 21/6218* (2013.01)

(58) Field of Classification Search

CPC ....... G06F 3/1454; G06F 3/011; G06T 19/006

See application file for complete search history.

(56) References Cited

U.S. PATENT DOCUMENTS

| | | | | |
|---|---|---|---|---|
| 8,867,823 | B2 | 10/2014 | Wildeboer | |
| 9,704,298 | B2 | 7/2017 | Espeset | |
| 2009/0310094 | A1 | 12/2009 | Jung | |
| 2014/0331334 | A1 | 11/2014 | Kamai | |
| 2015/0227395 | A1 | 8/2015 | Abuelsaad | |
| 2016/0242035 | A1 | 8/2016 | Chaillan | |
| 2016/0378334 | A1* | 12/2016 | Liu | G06F 3/04886 715/794 |
| 2017/0166417 | A1* | 6/2017 | Salmikuukka | G06F 40/58 |
| 2019/0188918 | A1* | 6/2019 | Brewer | G06T 19/006 |
| 2020/0211508 | A1* | 7/2020 | Clarke | G09G 3/003 |
| 2020/0302510 | A1* | 9/2020 | Chachek | G06Q 30/0639 |

(Continued)

FOREIGN PATENT DOCUMENTS

JP 2017501516 A 1/2017

OTHER PUBLICATIONS

Authors et al.: Disclosed Anonymously, "Knock-Knock User Alert System for Virtual and Augmented Reality", IP.com No. IPCOM000254029D, IP.com Electronic Publication Date: May 25, 2018, 3 Pages.

(Continued)

*Primary Examiner* — Yi Yang

(74) *Attorney, Agent, or Firm* — Harrity & Harrity, LLP

(57) ABSTRACT

An extended reality (XR) platform may determine one or more parameters for displaying XR content. The XR platform may receive a request to display the XR content from an XR device associated with a user. The XR platform may determine the one or more display parameters based on a context associated with the XR device and/or the user of the XR device.

20 Claims, 9 Drawing Sheets

(56) References Cited

U.S. PATENT DOCUMENTS

2022/0174111 A1 * 6/2022 Lopez Mendez ..... H04L 67/568

OTHER PUBLICATIONS

Authors et al.: Disclosed Anonymously, "Method and System for Replying to a Smartwatch Message", IP.com No. IPCOM000263871D, IP.com Electronic Publication Date: Oct. 13, 2020, 6 Pages.
Authors et al.: Disclosed Anonymously, "Smart Pattern Overlays for Transparency Controls", IP.com No. IPCOM000265554D, IP.com Electronic Publication Date: Apr. 23, 2021, 5 Pages.
Authors et al.: Disclosed Anonymously, "System for masking confidential areas on presentation screen and displaying unmasked content in presenter's mixed reality glasses", IP.com No. IPCOM000255529D, IP.com Electronic Publication Date: Oct. 1, 2018, 2 Pages.
VVVV, "How To Project On 3D Geometry", VVVV, Accessed Apr. 7, 2022, 4 Pages.

* cited by examiner

EXTENDED REALITY CONTENT DISPLAY BASED ON A CONTEXT

BACKGROUND

"Extended reality" (XR) is an umbrella term that encompasses augmented reality (AR), mixed reality (MR), virtual reality (VR), and everything in between. For example, augmented reality generally refers to interactive technologies in which objects in a real-world environment are "augmented" using computer-generated virtual content that may be overlaid on the real-world environment. "Mixed reality," sometimes referred to as "hybrid reality," similarly merges real and virtual worlds to produce a visual environment in which real physical objects and virtual digital objects can co-exist. However, in addition to overlaying virtual objects on the real-world environment, mixed reality applications often anchor the virtual objects to the real-world and allow users to interact with the virtual objects. "Virtual reality" refers to fully immersive computer-generated experiences that take place in a simulated environment, often incorporating auditory, visual, haptic, and/or other feedback mechanisms.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
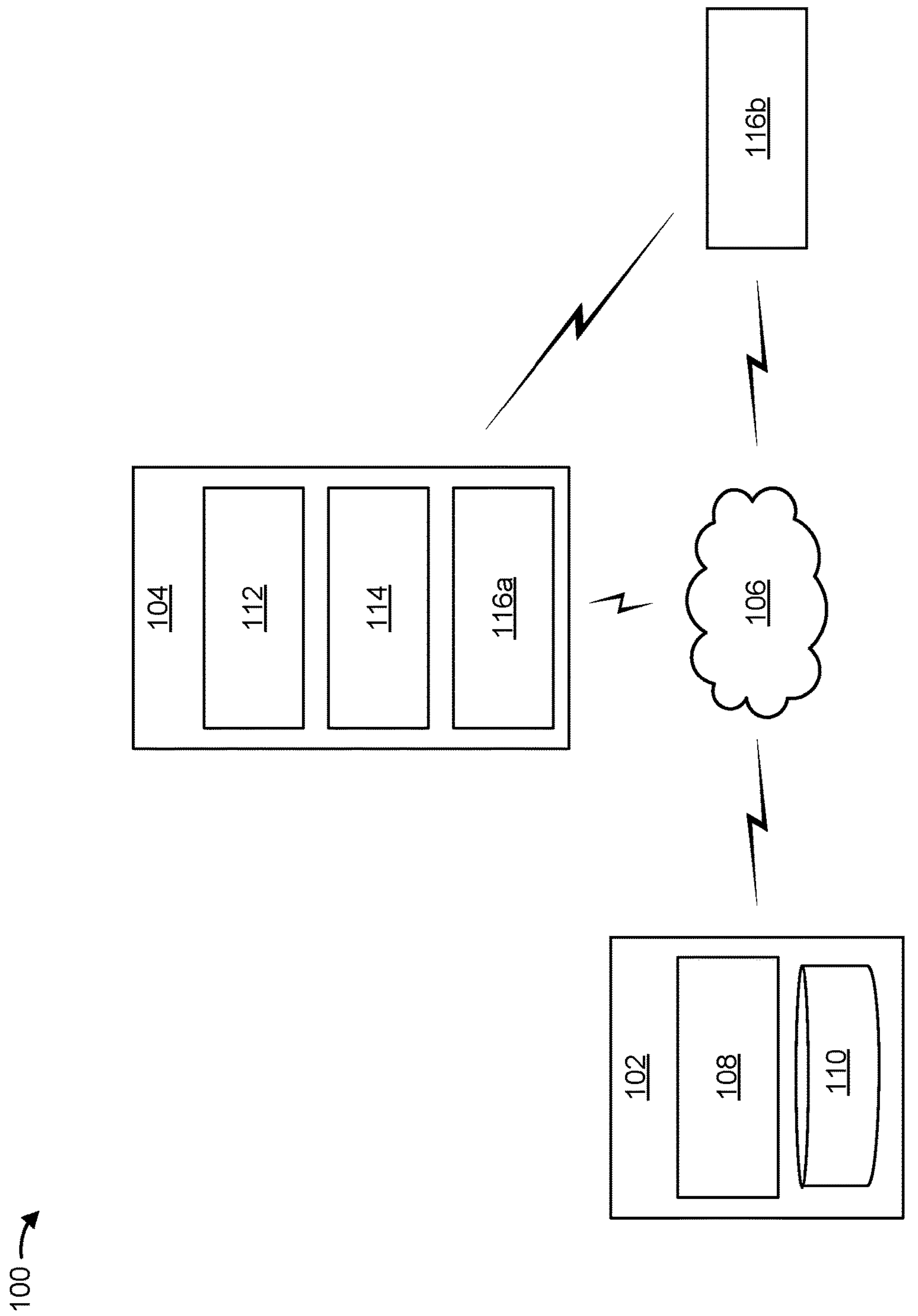
FIGS. 1A-1C are diagrams of an example implementation associated with displaying extended reality (XR) content based on a context, as described herein.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Extended reality (XR) content may include digital content that is created for display by an XR device. XR content may include three-dimensional content (e.g., three-dimensional video, three-dimensional virtual objects), two-dimensional content (e.g., two-dimensional video, two-dimensional virtual objects), and/or a mixture of three-dimensional and two-dimensional elements.

Some XR content may be created for viewing by a single user, whereas other XR content may be created for viewing by multiple users. Displaying XR content using an improper type of XR device may result in an inability for multiple users to view XR content that is created for viewing by multiple concurrent users but displayed by an XR device that only enables viewing of the XR content by a single concurrent user. For example, displaying a multiplayer augmented reality (AR) video game using AR glasses may enable a user of the AR glasses to view the multiplayer AR video game while preventing other users from viewing the multiplayer AR video game.

Moreover, displaying XR content using an improper type of XR device may result in compromised security. For example, displaying a live stream of a virtual doctor visit using a three-dimensional projector AR device may compromise the security of a user of the live stream of the virtual doctor visit in that other users may inadvertently be able to view the live stream of the virtual doctor visit.

In some implementations described herein, an XR platform determines one or more parameters for displaying XR content. The XR platform may receive a request to display the XR content from an XR device associated with a user. The XR platform may determine the one or more display parameters based on a context associated with the XR device and/or the user of the XR device. For example, the XR platform may determine whether the XR content can be securely displayed at a location of the XR device. As another example, the XR platform may determine whether the XR content can be displayed to multiple users using the XR device (e.g., if the XR content is created for viewing by multiple concurrent users). As another example, the XR platform may determine whether XR device is located in a particular geographic location for geofenced XR content. As another example, the XR platform may determine an XR display that is to display XR content if an XR device is associated with a plurality of XR displays. As another example, the XR platform may determine that the user of the XR device is not currently viewing an XR display of the XR device, and may refrain from causing XR content to be displayed on the XR display based on determining that the user is not currently viewing the XR display.

In this way, the techniques described herein enable security for XR content to be maintained by determining whether the XR content can be displayed on an XR device in a secure environment. Moreover, the techniques described herein enable processing and memory resources of an XR device to be conserved by refraining from displaying XR content that is created for viewing by multiple concurrent users if the XR device can only support viewing by a single concurrent user. Further, refraining from causing XR content to be displayed on an XR display based on determining that as user of the XR device is not currently viewing an XR display of the XR device conserves processing and memory resources of the XR device that would otherwise be wasted on displaying XR content that is not viewed by a user. Moreover, this conserves processing and memory resources of the XR device that would otherwise be wasted on redisplaying the XR content when the user is actually viewing the XR display. In addition, if the XR platform determines that XR content is not to be displayed at a particular time due to the user of the context associated with the XR device, the XR platform may use machine learning and/or artificial intelligence (AI) to determine a subsequent time at which to display the XR content. This conserves processing, memory, and/or networking resources of the XR device in that the XR device does not need to generate and transmit subsequent requests for display of the XR content to the XR platform.

Figure 1B:
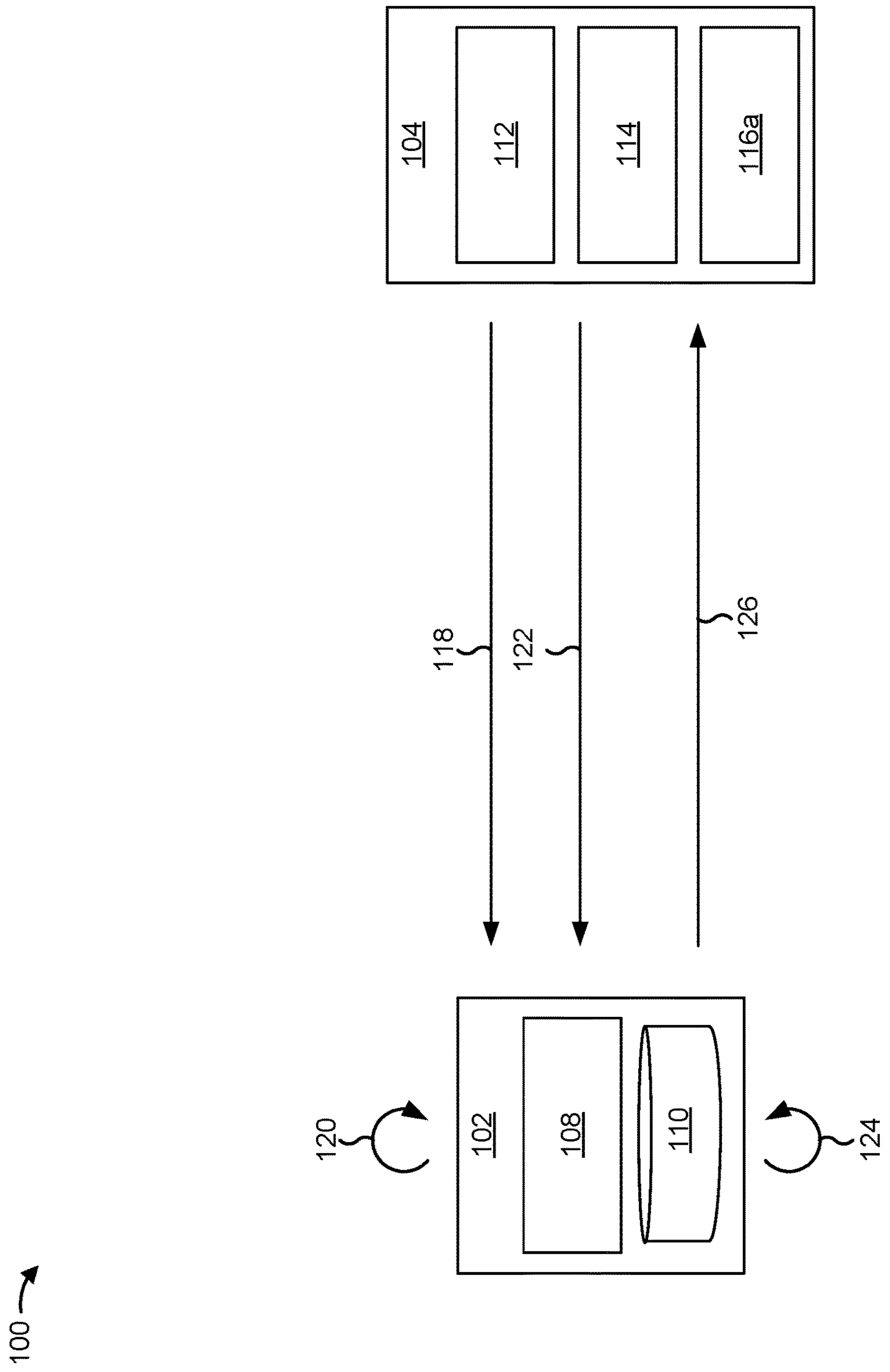
Figure 1C:
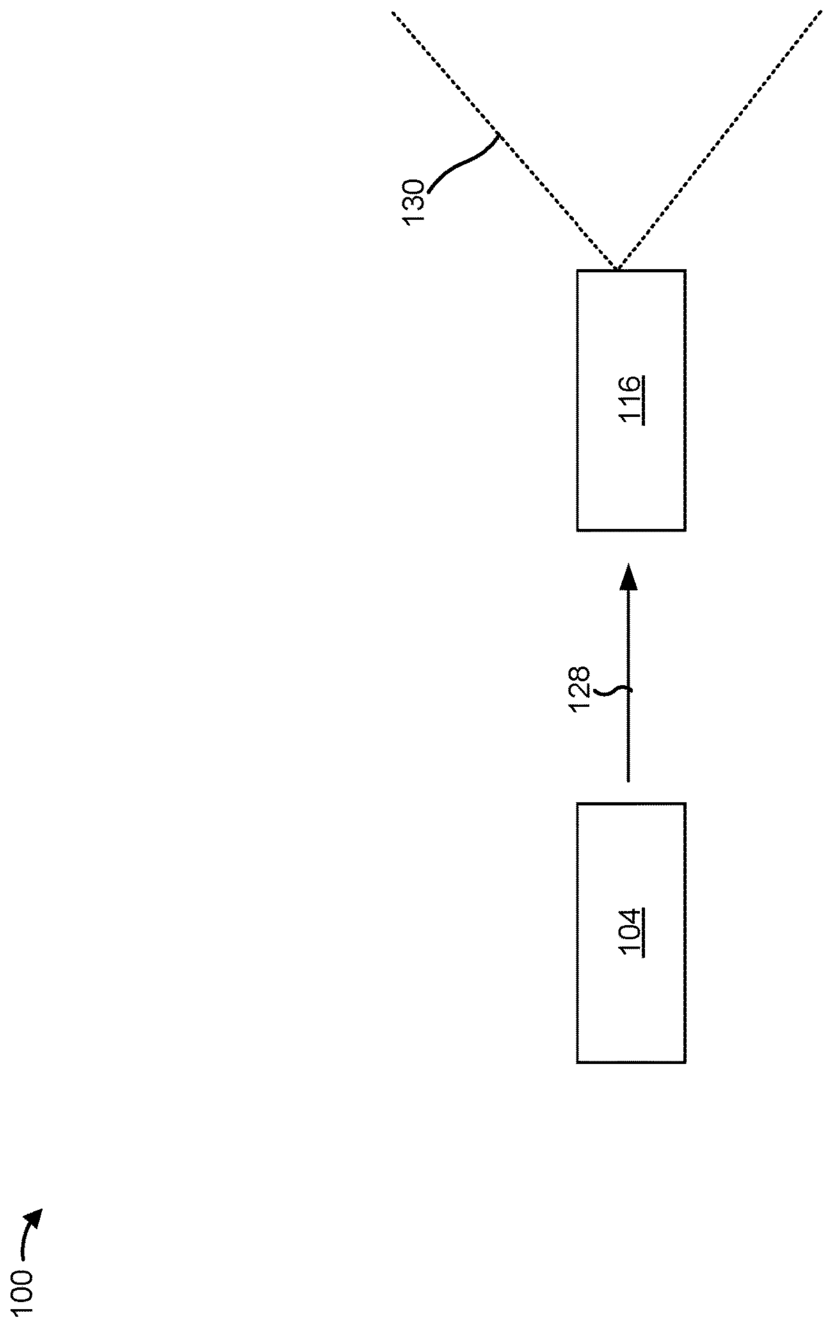

FIGS. 1A-1C are diagrams of an example implementation 100 associated with displaying XR content based on a context, as described herein. As shown in FIG. 1A, the example implementation 100 may include an XR platform 102 and an XR device 104 that communicate over a network 106, among other examples.

The XR platform 102 may include a cloud-based platform, a server-based platform, and/or another type of platform that executes an XR application host 108. The XR application host 108 includes an XR gaming application, an XR video streaming application, a VR application, an AR application, and/or another type of XR application.

The XR platform 102 may also include a data repository 110. The data repository 110 may be configured to store data and information associated with the XR application host 108, the XR device 104, and/or a user of the XR device 104, among other examples. For example, the data repository 110 may store sensor data associated with one or more sensors of the XR device 104, may store application data associated with an XR application client of the XR device 104, and/or may store other data associated with the XR device 104. In some implementations, the data repository 110 may store historical statistics of the sensor data, such as averages, for subsequent comparison and analysis. In some implementations, the data repository 110 may store historical data associated with previous requests for XR content. In some implementations, the data repository 110 may store observations made by the XR device 104 based on the sensor data. In some implementations, the data repository 110 may store a user profile associated with a user of the XR device 104. The user profile may include the name of the user, the age of the user, an address, an email address, a voice sample, an image of the user, a phone number, a credit card number, an account number, a resume, a medical record, a social network affiliation, an employer, and a confidential access authorization level. The user profile may also include user preferences. For example, a user may specify preferred scenarios for display of XR content.

In some implementations, the data repository 110 may be located on the XR platform 102. Additionally and/or alternatively, the data repository 110 may be located remote from the XR platform 102 and accessible by the XR platform 102 through the network 106. The data repository 110 may include an electronic file system, a database, a table, a spreadsheet, an electronic file, and/or another type of data structure. The data repository 110 may be implemented by any type of storage device capable of storing data and information, such as a database server, a storage device, and/or a memory device, among other examples.

The XR platform 102 may contain various accessible data sources, such as the data repository 110, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. The XR application host 108 enables the authorized and secure processing of personal data. The XR application host 108 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. The XR application host 108 provides information regarding personal data and the nature (e.g., type, scope, purpose, duration, etc.) of the processing. The XR application host 108 provides the user with copies of stored personal data. The XR application host 108 allows the correction or completion of incorrect or incomplete personal data. The XR application host 108 allows the immediate deletion of personal data.

The XR device 104 may include a client device or a user device that executes an XR application client 112. The XR application client 112 may communicate with the XR application host 108 on the XR platform 102 over the network 106 to provide data to and/or receive XR content from the XR application host 108. For example, the XR application client 112 may provide (e.g., to the XR application host 108) gaming data, XR/VR/AR pose data, sensor data, and/or another type of data associated with the XR application client 112, the XR device 104, and/or a user of the XR device 104. As another example, the XR application client 112 may receive (e.g., from the XR application host 108) XR content such as rendered video streams, unrendered video streams, audio streams, and/or another type of XR content.

The XR device 104 may include one or more sensors 114, an XR display 116*a*, and/or another component. The one or more sensors 114 may include a gyroscope, an accelerometer, a camera, an infrared sensor, a global positioning system (GPS) sensor, a microphone, and/or another type of sensor. In some implementations, a sensor 114 may generate sensor data that indicates an orientation of the XR device 104. In some implementations, a sensor 114 may generate sensor data that indicates a geographic location of the XR device 104. In some implementations, a sensor 114 may generate sensor data that indicates a noise level of an environment in which the XR device 104 is located. In some implementations, sensor 114 may generate sensor data based on weather conditions, such as air temperature, relative humidity, presence and type of precipitation, and/or wind speed, among other examples. In some implementations, a sensor 114 may include one or more types of pressure sensors and/or strain gauges, for example, to generate sensor data based on a user sitting or standing in a particular location. In some implementations, a sensor 114 may include a biometric sensor for detecting the physical condition of the user, such as blood pressure, heart rate, respiratory rate, calories burned, calories consumed, pulse, oxygen levels, blood oxygen level, glucose level, blood pH level, salinity of user perspiration, skin temperature, galvanic skin response, electrocardiography (ECG or EKG) data, body temperature, and/or eye tracking data, among other examples. In one embodiment, sensor(s) 114 transmit data directly to, and/or obtain data directly from, the data repository 110.

The XR display 116*a* may include a display screen, a projector (e.g., a three-dimensional projector), AR glasses, a VR headset, and/or another type of display that is capable of displaying XR content to one or more users. As shown in FIG. 1A, the XR display 116*a* may be included as part of the XR device 104. Additionally and/or alternatively, an XR display 116*b* may be located remote from the XR device 104, and the XR device 104 may provide XR content for display by the XR display 116*b* through the network 106 and/or through a direct connection.

In some implementations, the XR device 104 and/or the XR display 116*b* are configured to be deployed in a semiconductor processing facility. For example, the XR device 104 and/or the XR display 116*b* may be deployed at a semiconductor processing tool (e.g., a deposition tool, a photolithography tool) such that XR content may be displayed to train personnel in operating the semiconductor processing tool. As another example, the XR device 104 and/or the XR display 116*b* may be deployed in the semiconductor processing facility to enable proposed layout changes and/or storage changes to be visualized.

The network 106 may include a telecommunications network, a local area network (LAN), a wide area network (WAN), such as the Internet, a combination thereof, and/or another type of network. The network 106 may include wired, wireless, or fiber optic connections. The network 106 may include one or more wired and/or wireless networks capable of receiving and transmitting XR content, data, voice, and/or video signals, including multimedia signals that include voice, data, and video information. In general, network 106 may include any combination of connections and protocols that support communications between the XR platform, the XR device 104, and/or the XR display 116*b*, among other examples.

As shown in FIG. 1B, the XR platform 102 may perform operations to analyze a context associated with of the XR device 104, a user of the XR device 104 and/or the XR display 116*b*. The context may be used to determine one or more display parameters for displaying XR content on the XR display 116*a* and/or on the XR display 116*b*. The context enables the XR platform 102 to determine when XR content is to be displayed, where XR content is to be displayed, whether the environment in which the XR content is to be displayed provides sufficient security of the XR content, and/or another display parameter for the XR content.

At 118, the XR platform 102 may receive a request for displaying XR content. In some implementations, the XR device 104 transmits the request to the XR platform 102 through the network 106. In some implementations, the XR device 104 transmits the request to the XR platform 102 based on receiving an input from a user of the XR device 104. In some implementations, the XR device 104 transmits the request to the XR platform 102 based on determining that a threshold has been satisfied or based on the occurrence of an event. As an example, the XR device 104 may transmit the request to the XR platform 102 based on determining that a quantity of users near the XR device 104 satisfies a threshold quantity. As another example, the XR device 104 may transmit the request to the XR platform 102 based on determining that a user is looking at the XR display 116*a* and/or the XR display 116*b* (e.g., based on sensor data generated by the one or more sensors 114). As another example, the XR device 104 may transmit the request to the XR platform 102 based on determining that the XR device 104 is in motion (e.g., based on sensor data generated by the one or more sensors 114). As another example, the XR device 104 may transmit the request to the XR platform 102 based on determining that the XR device 104 is at rest (e.g., based on sensor data generated by the one or more sensors 114).

At 120, the XR platform 102 may determine a context. The context may be associated with of the XR device 104, a user of the XR device 104, the XR display 116*a*, and/or the XR display 116*b*. The context includes various environmental and/or contextual parameters associated with of the XR device 104, a user of the XR device 104, the XR display 116*a*, and/or the XR display 116*b*. For example, the context may include parameters such as a location of the XR device 104, a location of the XR display 116*a*, a location of the XR display 116*b*, a quantity of users near the XR device 104, a quantity of users viewing the XR display 116*a*, and/or quantity of users viewing the XR display 116*b*. As another example, the context may include parameters such as whether a user of the XR device 104 is viewing the XR display 116*a*, whether a user of the XR device 104 is viewing the XR display 116*b*, whether the XR device 104 is in motion or at rest, and/or an orientation of the XR device 104, among other examples. The XR platform 102 may determine the context based on sensor data and other information received from the XR device 104 at 122. The XR platform 102 may store the context in the data repository 110 and may update the context (e.g., continually update, update in real-time) as additional sensor data and other information is received from the XR device 104.

At 124, the XR platform 102 may determine one or more display parameters for displaying the XR content requested from the XR device 104. The one or more display parameters may include an XR display type for displaying the XR content, a time at which the XR content is to be displayed, a security level for displaying the XR content, a quantity of users that are permitted to view the XR content, and/or another display parameter.

The XR platform 102 may determine the one or more display parameters based on the context determined at 122. For example, if the XR platform 102 determines that multiple users are present near the XR display 116*a* and/or near the XR display 116*b*, and the XR content includes confidential information for the user of the XR device 104, the XR platform 102 may determine that the XR content is to be displayed on a personal XR display (e.g., AR glasses or a VR headset) such that only the user of the XR device 104 can view the XR content. This prevents unauthorized users from viewing the confidential information in the XR content.

As another example, the XR platform 102 may determine the XR display type on which the XR content is to be displayed based on a quantity of users near the XR display 116*a* and/or near the XR display 116*b*. In this way, the XR platform 102 may select an XR display type (e.g., a multi-user XR display such as a three-dimensional projector) that supports viewing of the XR content by multiple users.

As another example, the XR platform 102 may determine, based on the context, that the user of the XR device 104 is looking at the XR display 116*a* instead of the XR display 116*b*. Here, the XR platform 102 may identify the XR display 116*a* for displaying the XR content.

In some implementations, the XR platform 102 may determine the one or more display parameters based on a user profile associated with the user of the XR device 104. The user profile may be stored in the data repository 110. As an example, the XR platform 102 may determine a time for displaying the XR content based on a schedule of the user indicated in the user profile. As another example, the XR platform 102 may determine the XR display on which to display the XR content based on an indication of a preferred XR display type in the user profile.

At 126, the XR platform 102 may cause the XR content to be displayed on the XR display 116*a* and/or on the XR display 116*b*. The XR application host 108 may provide (e.g., through the network 106) an instruction for the XR device 104 to display the XR content on the XR display 116*a* and/or on the XR display 116*b*. Moreover, the XR application host 108 may provide the XR content to the XR device 104 through the network 106. The instruction and/or the XR content may be received at the XR application client 112 of the XR device 104.

As shown in FIG. 1C, at 128, the XR device 104 may provide the XR content to an XR display 116. At 130, the XR display 116 may display the XR content for viewing by one or more users. In some implementations, the XR display 116 includes the XR display 116*a* on the XR device 104. In these implementations, the XR device 104 provides the XR content to the XR display 116*a* on one or more internal connections, such as on an internal communication bus, on one or more conductive traces, and/or on an optical communication interface, among other examples. In some implementations, the XR display 116 includes the XR display 116*b* (which is remote from the XR device 104). In these implementations, the XR device 104 provides the XR content to the XR display 116*b* through the network 106 and/or on a direct connection with the XR display 116*b*.

As indicated above, FIGS. 1A-1C is provided as an example. Other examples may differ from what is shown and described in connection with FIGS. 1A-1C.

Figure 2:
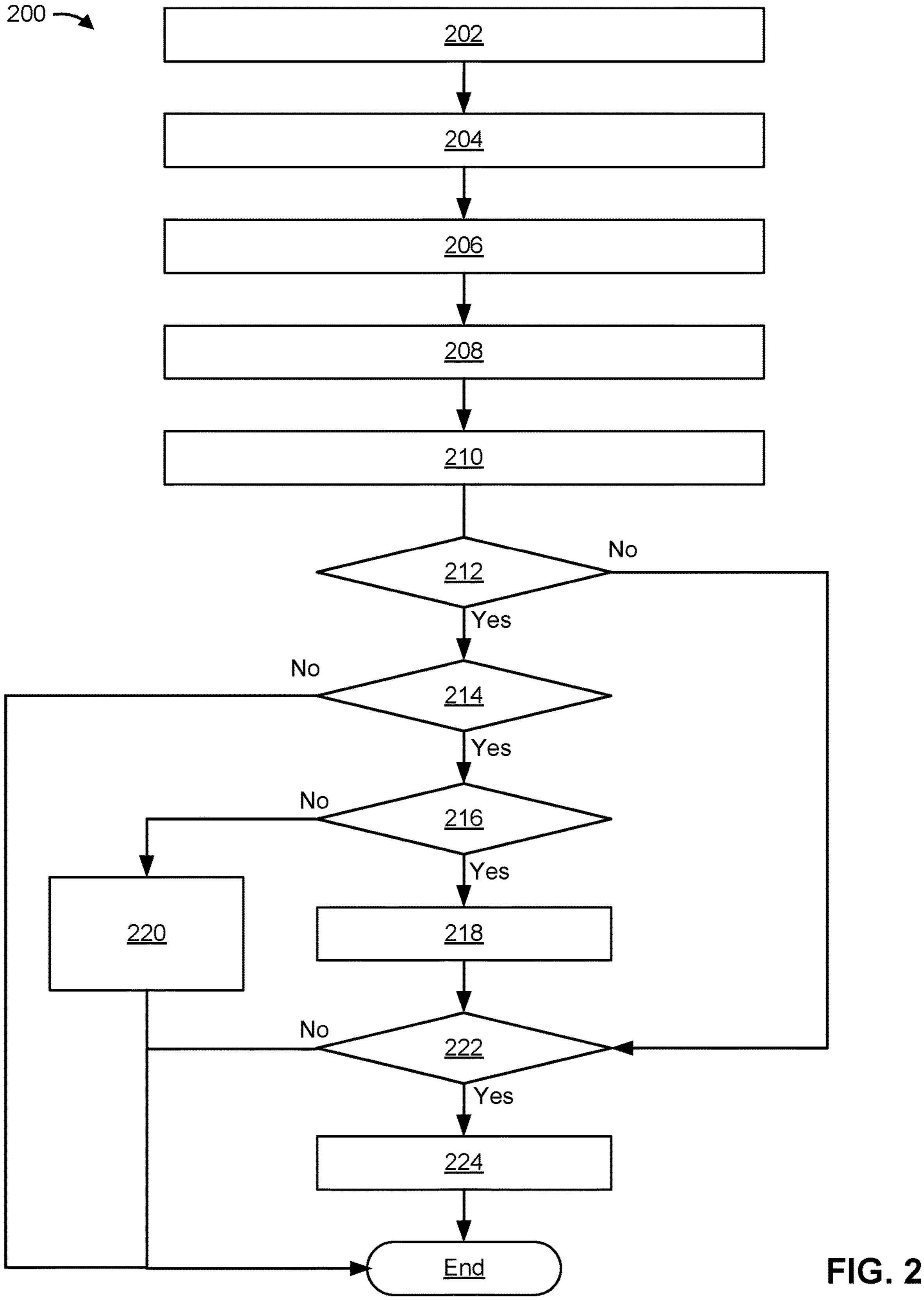
FIG. 2 is a diagram of an example implementation of displaying XR content based on a context, as described herein.

FIG. 2 is a diagram of an example implementation 200 of displaying XR content based on a context, as described herein. In some implementations, one or more of the operations described in connection with FIG. 2 are performed by the XR platform 102. In some implementations, one or more of the operations described in connection with FIG. 2 are performed by another device, such as the XR device 104, the sensors 114, the XR display 116*a*, and/or the XR display 116*b*, among other examples.

At 202, the XR application host 108 of the XR platform 102 may receive a request for XR content. In some implementations, the XR application host 108 may receive the request from the XR application client 112 of the XR device 104 through the network 106. For example, while performing an activity, a user of the XR device 104 may want guidance regarding a correct sequence of actions associated with an activity, and the user uses the XR application client 112 to request XR content in the form a three-dimensional display of the actions. In some implementations, where one of the sensor(s) 114 is a microphone, the XR application client 112 may receive the request in the form a voice command from the user. In some implementations, the XR application host 108 may receive a request for XR content based on detected conditions in an environment in which the XR device 104 is located. For example, the XR application client 112 may determine, based on sensor data received from the one or more sensors 114, that a quantity of people gathered near the XR device 104 for XR content satisfies a threshold quantity. The XR application client 112 may provide the request for the XR content to the XR application host 108 based on determining that the quantity of people satisfies the threshold quantity.

At 204, the XR application host 108 of the XR platform 102 may determine a context of the request. In some implementations, the XR application host 108 of the XR platform 102 determines the context of the request based on the current activity of the user of the XR device 104. For example, by monitoring the sensor data generated by the one or more sensor 114, the XR application host 108 of the XR platform 102 may determine a location of the user (which corresponds to a location of the XR device 104) and whether the user is engaged in a physical activity or is at rest. In some implementations, the XR application host 108 of the XR platform 102 determines the context of the request based on historical data associated with past requests for assistance, guidance, and/or display of XR content. For example, the XR application host 108 of the XR platform 102 may retrieve data from the data repository 110 associated with one or more requests for assistance while the user was at work and determine the context of the current request is similar to a past request. In some implementations, the XR application host 108 of the XR platform 102 determines the context of the request based on information included in the received request. For example, if the user speaks the request of "show me the design for product ABC," then the XR application host 108 of the XR platform 102 may determine that the request is work-related.

At 206, the XR application host 108 of the XR platform 102 may identify the content and location for display of the XR content. In some implementations, based on the received request and/or on the determined context of the request, the XR application host 108 of the XR platform 102 identifies an object (e.g., an XR object) to be projected and a location where the object is to be projected. For example, the XR application host 108 of the XR platform 102 may determine that the request is to project a three-dimensional rendering of a design that the user is working on in a conference room located in an office. In another example, the XR application host 108 of the XR platform 102 determines whether to project the XR content on a fixed object or anywhere in the area surrounding the user.

At 208, the XR application host 108 of the XR platform 102 may determine one or more capabilities of the XR device 104, the XR display 116*a*, and/or the XR display 116*b*. In some implementations, where the XR device 104, the XR display 116*a*, and/or the XR display 116*b* is a head mounted display, such as AR glasses or a VR headset, the XR application host 108 of the XR platform 102 may determine the technical capabilities of the XR device 104, the XR display 116*a*, and/or the XR display 116*b*. For example, the XR application host 108 of the XR platform 102 may determine whether one or more of the sensor 114 is capable of capturing eye gaze information associated with the user, which the XR application host 108 of the XR platform 102 can use to determine the field of view of the user. In another example, the XR application host 108 of the XR platform 102 may determine whether the one or more of sensor 114 can detect head movement of the user, such that the XR application host 108 of the XR platform 102 can detect one or more patterns of head movement of the user. In a further example, the XR application host 108 of the XR platform 102 may determine if the computing capacity and/or response time of the XR device 104, the XR display 116*a*, and/or the XR display 116*b* are capable of keeping the XR device 104, the XR display 116*a*, and/or the XR display 116*b* aligned with the speed of the head movement of the user.

At 210, the XR application host 108 of the XR platform 102 may cause the XR content to be displayed on the XR display 116*a* and/or the XR display 116*b*. In some implementations, where the XR device 104, the XR display 116*a*, and/or the XR display 116*b* is a pair of AR glasses or a VR headset, based on the capabilities of the XR device 104, the XR display 116*a*, and/or the XR display 116*b*, the XR application host 108 of the XR platform 102 may cause the requested XR content to be displayed on the XR display 116*a*, and/or the XR display 116*b* such that the user can view the XR content in the field of view of the user.

At 212, the XR application host 108 of the XR platform 102 may determine whether other users are present. In some implementations, where the one or more sensors 114 include one or more cameras, the XR application host 108 of the XR platform 102 uses the one or more cameras to monitor the surrounding area of the user to determine whether one or more other users are present who may want to view the XR content displayed by the XR display 116*a* and/or the XR display 116*b*. For example, if the surrounding area of the user is a conference room, the XR application host 108 of the XR platform 102 may determine whether other users are present in the conference room. In some implementations, where the XR application host 108 of the XR platform 102 is included in an Internet of things (IoT) platform, the XR application host 108 of the XR platform 102 uses components of the IoT platform (e.g., cameras and/or microphones) to monitor the surrounding area.

At 214, if the XR application host 108 of the XR platform 102 determines that other users are present (212—Yes), the XR application host 108 of the XR platform 102 may determine whether the other users that are present are authorized to view the XR content. In some implementations, the XR application host 108 of the XR platform 102 determines whether the projected XR content includes any sensitive and/or confidential information which requires authorization to view. If so, the XR application host 108 of the XR platform 102 determines whether the one or more other users present in the surrounding area are authorized to view the XR content. In some implementations, the XR application host 108 of the XR platform 102 retrieves data from the data repository 110 to review user profiles associated with the one or more other users present in the surrounding area to determine a confidential access authorization level of the one or more other users. In some implementations, the XR application host 108 of the XR platform 102 determines whether the one or more other users present in the surrounding area are authorized to view the content by querying the user of XR device 104 via the XR application client 112. In some implementations, authorization to view the XR content may be based on other criteria, including, but not limited to, age, payment, and/or another factor. For example, if portions of the XR content are not appropriate for viewers below a pre-defined threshold age, then the XR application host 108 of the XR platform 102 can determine the ages of the users based on retrieving user profiles from data repository 110. In some implementations, the XR application host 108 of the XR platform 102 determines that some of the one or more other users present are authorized while some are not.

At 216, if the XR application host 108 of the XR platform 102 determines the other users present are authorized to view the content (214—Yes), the XR application host 108 of the XR platform 102 may determine whether the other users have access to a personal XR display (e.g., a set of AR glasses or a VR headset). In some implementations, in order to determine a location for the projection of the XR content for the one or more other users, the XR application host 108 of the XR platform 102 may determine whether the one or more other users have access to a personal XR display upon which the XR content may be displayed to the one or more other users.

At 218, if the XR application host 108 of the XR platform 102 determines that the one or more other users have access to a personal XR display upon which the XR content may be displayed to the one or more other users (216—Yes), then the XR application host 108 of the XR platform 102 may cause the XR content to be displayed on the personal XR displays associated with the one or more other users. In some implementations, if the one or more other users are authorized to view the XR content and are wearing personal XR displays, then the XR application host 108 of the XR platform 102 causes the XR content to be displayed on the personal XR displays of the one or more other users.

At 220, if the XR application host 108 of the XR platform 102 determines that the one or more other users do not have access to personal XR displays (216—No), the XR application host 108 of the XR platform 102 may cause the XR content to be displayed in the surrounding area on a multi-user XR display. The multi-user XR display may include a three-dimensional projector or another type of XR display that can display the XR content to the one or more other users simultaneously. In some implementations, the XR content is displayed on the XR display 116*a* and/or on the XR display 116*b* while also being displayed on the multi-user XR display such that all of the users in the surrounding area can view the XR content simultaneously. In some implementations, where some users are not authorized to view some or all of the XR content, the XR application host 108 of the XR platform 102 causes a portion of the XR content that satisfies the lowest level of authorization to be displayed in the surrounding area. In some implementations, if one or more other users have a higher level of authorization, the XR application host 108 of the XR platform 102 causes XR content that matches the authorization level to be displayed on the XR displays associated with those users with the higher level of authorization. In some implementations, where some users are not authorized to view some or all of the XR content, the XR application host 108 of the XR platform 102 can mask portions of the XR content projected in the surrounding area such that sensitive information is not projected to all of the users present in the surrounding area. In some implementations, the XR application host 108 of the XR platform 102 causes unmasked XR content to be displayed simultaneously on the XR displays associated with authorized users.

In some implementations, the XR application host 108 of the XR platform 102 monitors a level of interest in the XR content of each of the users. For example, the XR application host 108 of the XR platform 102 may monitor the eye gaze of a user (e.g., based on sensor data generated by the one or more sensors 114 and provided by the XR device 104) to determine a time duration that the user focuses on the XR content. The XR application host 108 of the XR platform 102 may determine that the level of interest exceeds a threshold level. Accordingly, if the user moves out of the surrounding area of the XR display on which the XR content is displayed, the XR application host 108 of the XR platform 102 may dynamically switch the XR content to another XR display near the user such that the user can continue viewing the XR content.

In some implementations, the XR platform 102 may determine the XR display to which the XR content is to be switched using a machine learning model. In this way, the XR platform 102 may use the machine learning model to predict the movement of the user and to preemptively switch the location at which the XR content is displayed based on the predicted movement of the user. In some implementations, the XR platform 102 uses the machine learning model to determine the XR display to which the XR content is to be switched by providing candidate display locations as input to the machine learning model, and using the machine learning model to determine a likelihood, probability, or confidence that the user will move to the candidate display locations. The machine learning model may be trained on historical movement data associated with the user, data associated with the user's schedule and movement patterns, and/or other data associated with the user and/or other users (e.g., hundreds or thousands of other users).

In some implementations, the XR platform 102 may determine the XR display to which the XR content is to be switched using artificial intelligence. In this way, the XR platform 102 may use artificial intelligence to predict the movement of the user and to preemptively switch the location at which the XR content is displayed based on the predicted movement of the user. In some implementations, the XR platform 102 uses artificial intelligence to determine the XR display to which the XR content is to be switched by providing candidate display locations as input to an artificial intelligence bot, and using the artificial intelligence bot to predict which candidate display location the user will move to. The artificial intelligence bot may be trained on historical movement data associated with the user, data associated with the user's schedule and movement patterns, and/or other data associated with the user and/or other users (e.g., hundreds or thousands of other users).

In some implementations, where the XR platform 102 is included in an IoT platform, the XR platform 102 may track the activity of the user over a period of time using one or more components of the IoT platform. The XR platform 102 may use machine learning and/or AI to predict the user's head movements based on detected patterns of head movements from the historical activity. The prediction of the head movement enables the XR platform 102 to seamlessly transfer the XR content between XR displays to maintain the projected XR objects within the field of view of the user. In some implementations, the XR platform 102 stores the tracked activity in the data repository 110.

At 222, if the XR application host 108 of the XR platform 102 determines that other users are not present (212—No), or based on causing the XR content to be displayed on one or more personal XR displays associated with one or more other users (218), the XR application host 108 of the XR platform 102 may determine whether a request to move the location at which the XR content is to be displayed. In some implementations, the XR application host 108 of the XR platform 102 receives a request from the XR application client 112 of the XR device 104 to move the location at which the XR content is to be displayed. For example, the request may be provided as input to the XR device 104 in the form of a finger gesture interacting with one or more objects displayed by the XR device 104. In another example, the request may be provided as input to the XR device 104 in the form a voice command. In some implementations, the XR application host 108 of the XR platform 102 receives the request when the user removes XR device 104 away from the user's eyes.

At 224, if the XR application host 108 of the XR platform 102 receives a request to move the location at which the XR content is to be displayed (222—Yes), the XR application host 108 of the XR platform 102 may cause the XR content to be displayed on another XR display at another location. In some implementations, the request indicates the XR display to which the XR content is to be moved. In these implementations, the XR application host 108 of the XR platform 102 may cause the XR content to be moved to the XR display indicated in the request.

Additionally and/or alternatively, the XR application host 108 of the XR platform 102 may proactively move the location at which the XR content is displayed. For example, the XR application host 108 of the XR platform 102 may determine (e.g., based on sensor data generated by the one or more sensors 114) that the XR content is likely to become obstructed within the field of view of the user (e.g., by an object, such as a building, or another viewer). Accordingly, the XR application host 108 of the XR platform 102 may cause the location at which the XR content is to be displayed to be dynamically changed so that the obstruction does not prevent the user from viewing the XR content.

In some implementations, the XR application host 108 of the XR platform 102 monitors (e.g., based on sensor data generated by the one or more sensors 114) one or more of the users in the area to determine whether the one or more users are distracted by the display of the XR content. For example, the XR application host 108 of the XR platform 102 may use one or more sentiment analysis techniques to determine, by words spoken or facial expressions, whether the one or more users are distracted by the display of the XR content. If the XR application host 108 of the XR platform 102 determines that the one or more users are distracted by the display of the XR content, the XR application host 108 of the XR platform 102 may dynamically moves the location of the display of the XR content to a personal XR display so that the one or more users are not subjected to the display of the XR content.

In some implementations, if the XR application host 108 of the XR platform 102 determines that the one or more other users present are not authorized to view the content (214— No), or if the XR application host 108 of the XR platform 102 determines that a request to move the location at which the XR content is to be displayed is not received (222—No), or based on the XR application host 108 of the XR platform 102 moving the location at which the XR content is displayed, the XR application host 108 of the XR platform 102 ends the execution.

As indicated above, FIG. 2 is provided as an example. Other examples may differ from what is shown and described in connection with FIG. 2.

Figure 3:
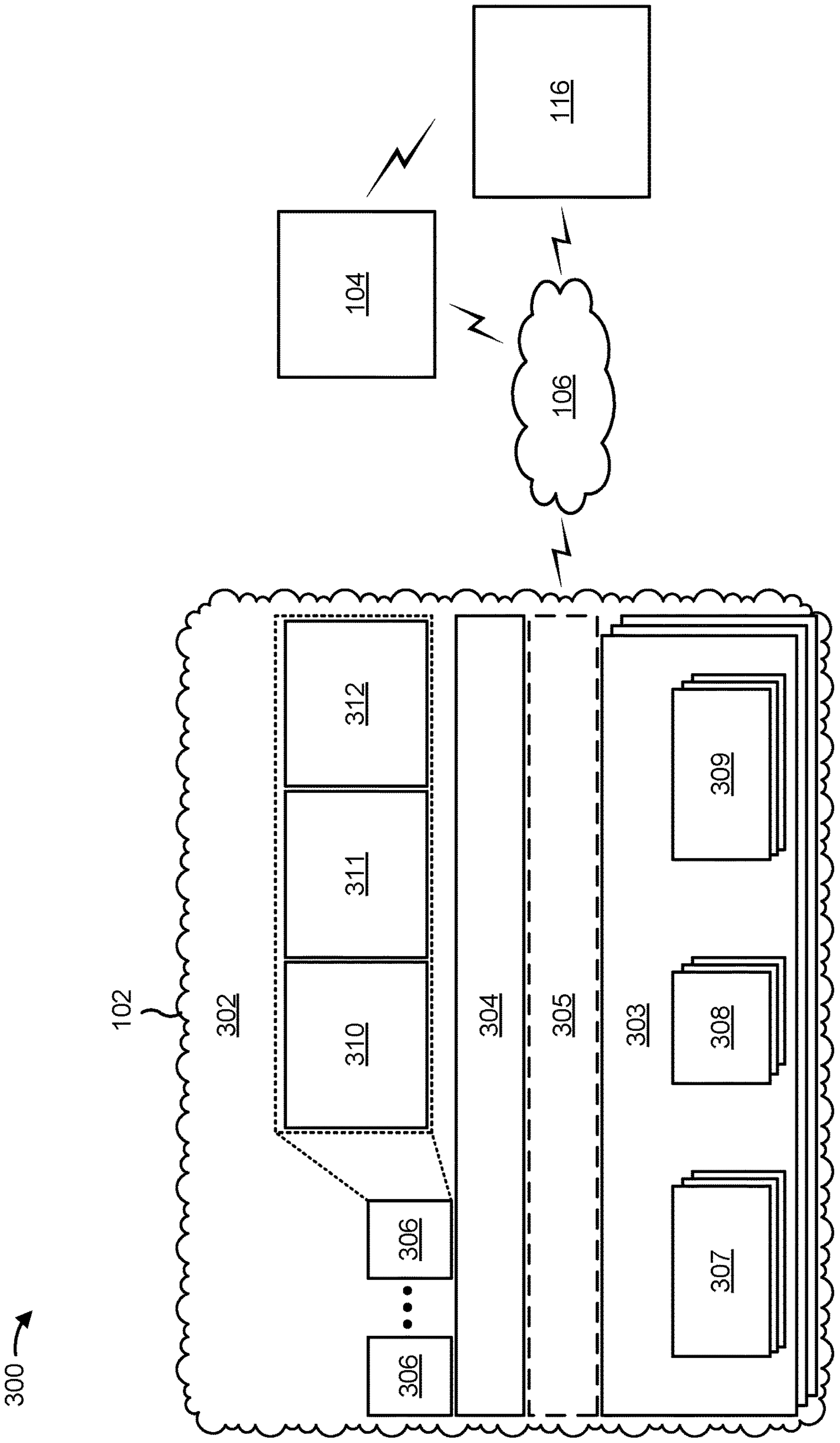
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a XR platform 102, which may include one or more elements of and/or may execute within a cloud computing system 302. The cloud computing system 302 may include one or more elements 303-312, as described in more detail below. As further shown in FIG. 3, environment 300 may include an XR device 104, a network 106, and/or an XR display 116, among other examples. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the XR platform 102 may include one or more elements 303-312 of the cloud computing system 302, may execute within the cloud computing system 302, and/or may be hosted within the cloud computing system 302, in some implementations, the XR platform 102 may not be cloud-based (e.g., may be implemented outside of a cloud computing system) or may be partially cloud-based. For example, the XR platform 102 may include one or more devices that are not part of the cloud computing system 302, such as device 400 of FIG. 4, which may include a standalone server or another type of computing device. The XR platform 102 may perform one or more operations and/or processes described in more detail elsewhere herein.

The XR platform 102 may be configured to analyze XR content to determine one or more parameters for displaying the XR content on the XR display 116. The XR platform 102 may be configured to receive a request for XR content from the XR device 104. The XR platform 102 may determine the one or more display parameters based on a context associated with the XR device 104 and/or a user of the XR device 104, as described herein.

The network 106 may include one or more wired and/or wireless networks. For example, the network 106 may include a cellular network, a public land mobile network (PLMN), a local area network (LAN), a wide area network (WAN), a private network, the Internet, and/or a combination of these or other types of networks. The network 106 enables communication among the devices of the environment 300.

The XR device 104 may include one or more devices that are configured to receive XR content, process XR content, and/or provide XR content for display. The XR device 104 may include a cellular phone (e.g., a smart phone), a personal digital assistant (PDA), a wireless modem, a wireless communication device, a handheld device, a laptop computer, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), and/or any other suitable device.

The XR display 116 may include AR glasses, a VR headset, a three-dimensional projector, and/or another type of display device that is configured to display XR content. In some implementations, an XR display 116 (e.g., the XR display 116*a*) is included in the XR device 104. In some implementations, an XR display 116 (e.g., the XR display 116*b*) is remote from the XR device 104, and the XR device 104 communicates with the XR display 116 through the network 106 and/or through a direct communication connection. The direct communication connection may include a Wi-Fi direct connection, a Bluetooth connection, a universal serial bus (USB) connection, a high-definition multimedia interface (HDMI) connection, a DisplayPort connection, and/or another suitable direct connection.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
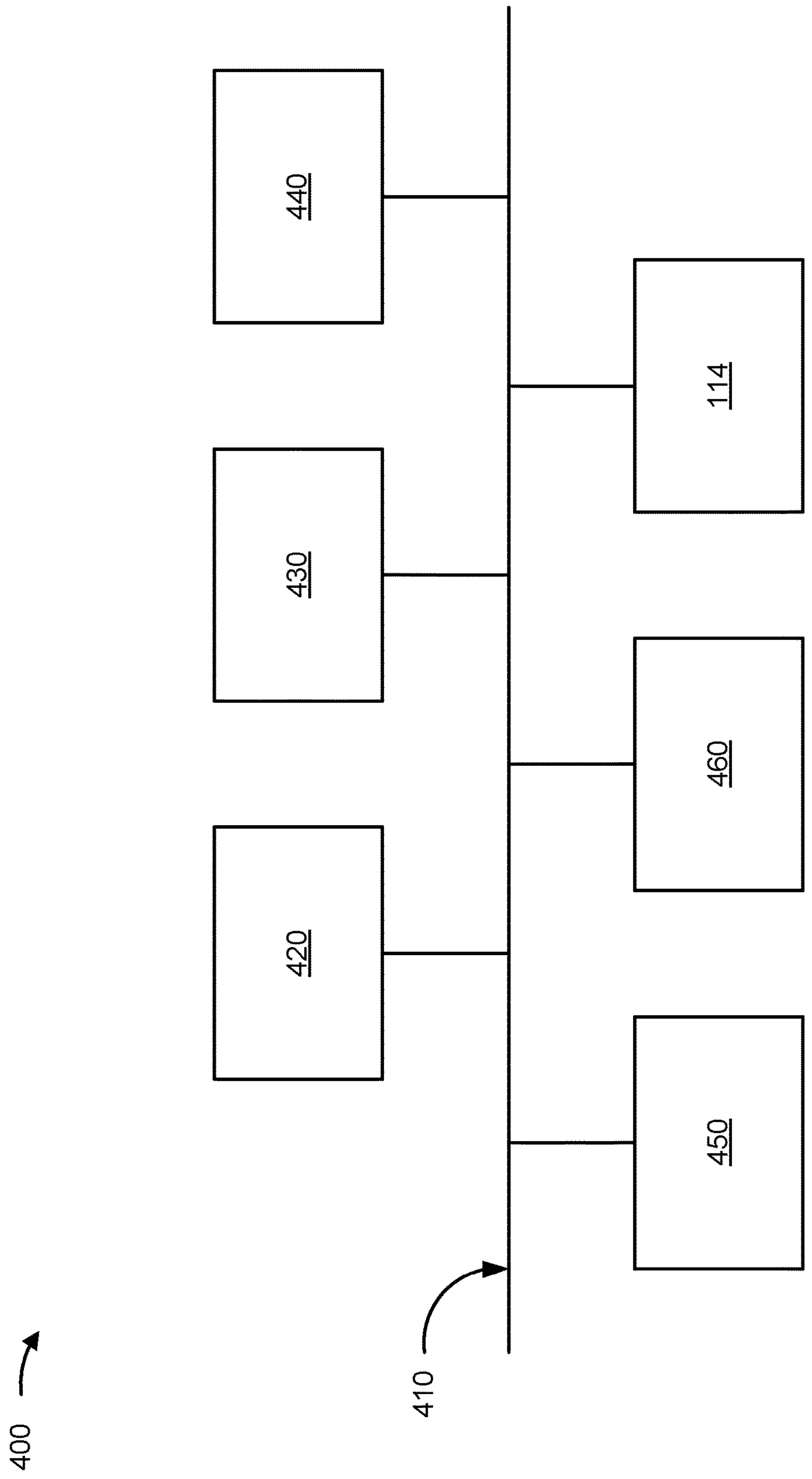
FIG. 4 is a diagram of example components of a device associated with displaying XR content based on a context.

FIG. 4 is a diagram of example components of a device 400 associated with displaying XR content based on a context. The device 400 may correspond to the XR platform 102, the XR device 104, one or more components included in the network 106, the one or more sensors 114, an XR display 116, the one or more processors 307, the one or more memories 308, and/or one or more networking components 309, among other examples. In some implementations, the XR platform 102, the XR device 104, one or more components included in the network 106, the one or more sensors 114, an XR display 116, the one or more processors 307, the one or more memories 308, and/or one or the more networking components 309, may include one or more devices 400 and/or one or more components of the device 400. As shown in FIG. 4, the device 400 may include one or more sensors 114, a bus 410, a processor 420, a memory 430, an input component 440, an output component 450, and/or a communication component 460.

The one or more sensors 114 may include a gyroscope, an accelerometer, a camera, an infrared sensor, a GPS sensor, a microphone, a humidity sensor, a biometric sensor, and/or another type of sensor.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
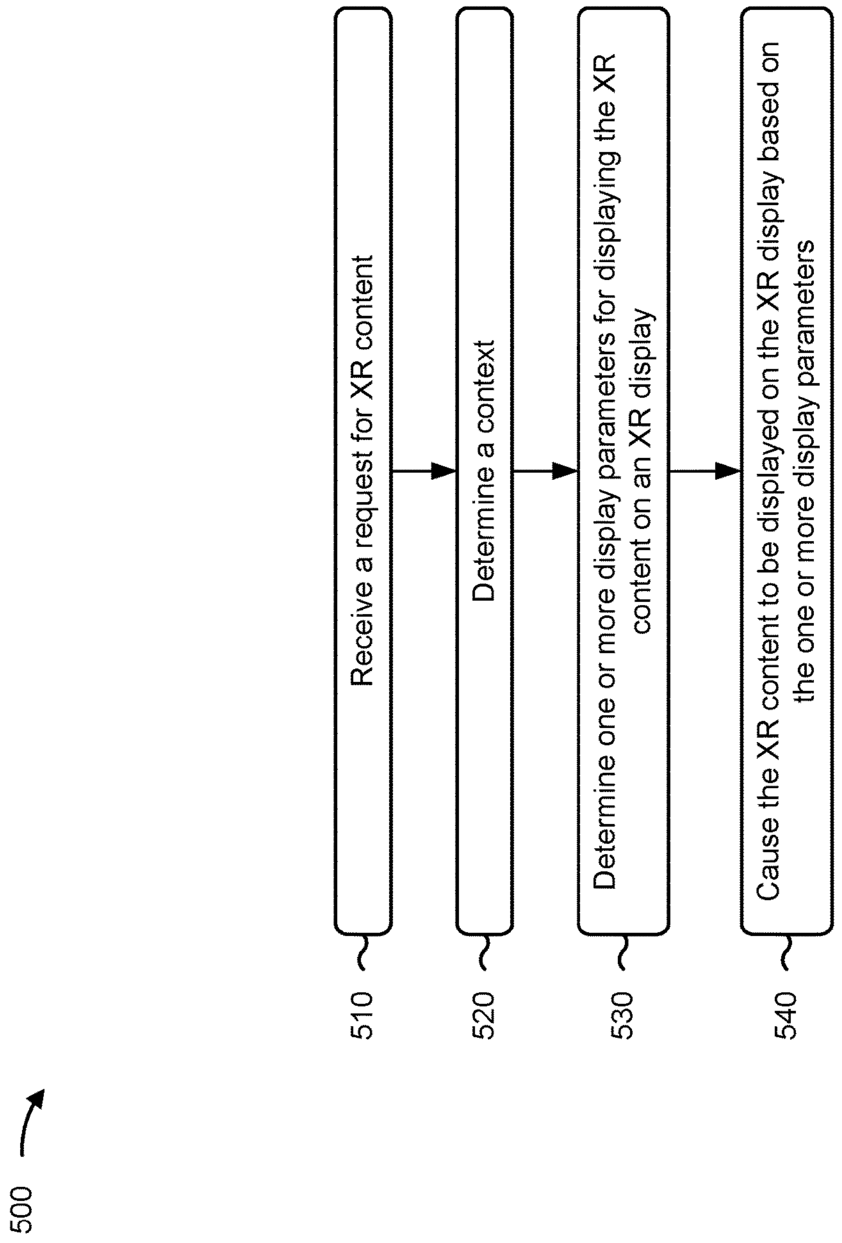
FIG. 5 is a flowchart of an example process associated with displaying XR content based on a context.

FIG. 5 is a flowchart of an example process 500 associated with displaying XR content based on a context. In some implementations, one or more process blocks of FIG. 5 are performed by an XR platform (e.g., XR platform 102, device 400). In some implementations, one or more process blocks of FIG. 5 are performed by another device or a group of devices separate from or including the XR platform, such as an XR device (e.g., XR device 104), an XR display (e.g., XR display 116, XR display 116*a*, XR display 116*b*). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving a request for XR content (block 510). For example, the XR platform 102 may receive a request for XR content, as described herein.

As further shown in FIG. 5, process 500 may include determining, based on the request, a context (block 520). For example, the XR platform 102 may determine, based on the request, a context, as described herein. In some implementations, the context is associated with at least one of: an XR device 104, a user associated with the XR device 104, or an XR display (e.g., XR display 116, XR display 116*a*, XR display 116*b*) associated with the XR device 104.

As further shown in FIG. 5, process 500 may include determining, based on the context, one or more display parameters for displaying the XR content on the XR display (block 530). For example, the XR platform 102 may determine, based on the context, one or more display parameters for displaying the XR content on the XR display, as described above.

As further shown in FIG. 5, process 500 may include causing the XR content to be displayed on the XR display based on the one or more display parameters (block 540). For example, the XR platform 102 may cause the XR content to be displayed on the XR display based on the one or more display parameters, as described above.

Process 500 may include additional implementations, such as any single implementation or any combination of implementations described below and/or in connection with one or more other processes described elsewhere herein.

In a first implementation, the context includes information identifying at least one of a location of the XR device 104, a location of the XR display, or a quantity of users viewing the XR display.

In a second implementation, alone or in combination with the first implementation, the context includes information identifying at least one of whether the user of the XR device 104 is viewing the XR display, whether the XR device 104 is in motion or at rest, or an orientation of the XR device 104.

In a third implementation, alone or in combination with one or more of the first and second implementations, determining the context comprises determining the context based on sensor data received from the XR device 104.

In a fourth implementation, alone or in combination with one or more of the first through third implementations, the one or more display parameters comprise at least one of a location at which the XR content is to be displayed, a time at which the XR content is to be displayed, or a security level of the XR content.

In a fifth implementation, alone or in combination with one or more of the first through fourth implementations, determining the one or more display parameters comprises determining the one or more display parameters based on user profiles associated with the user and one or more other users in view of the XR display.

In a sixth implementation, alone or in combination with one or more of the first through fifth implementations, determining the one or more display parameters comprises determining, based on the user profiles, respective authorization levels for the user and the one or more other users, and determining, based on the respective authorization levels, an XR display type of the XR display for displaying the XR content.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
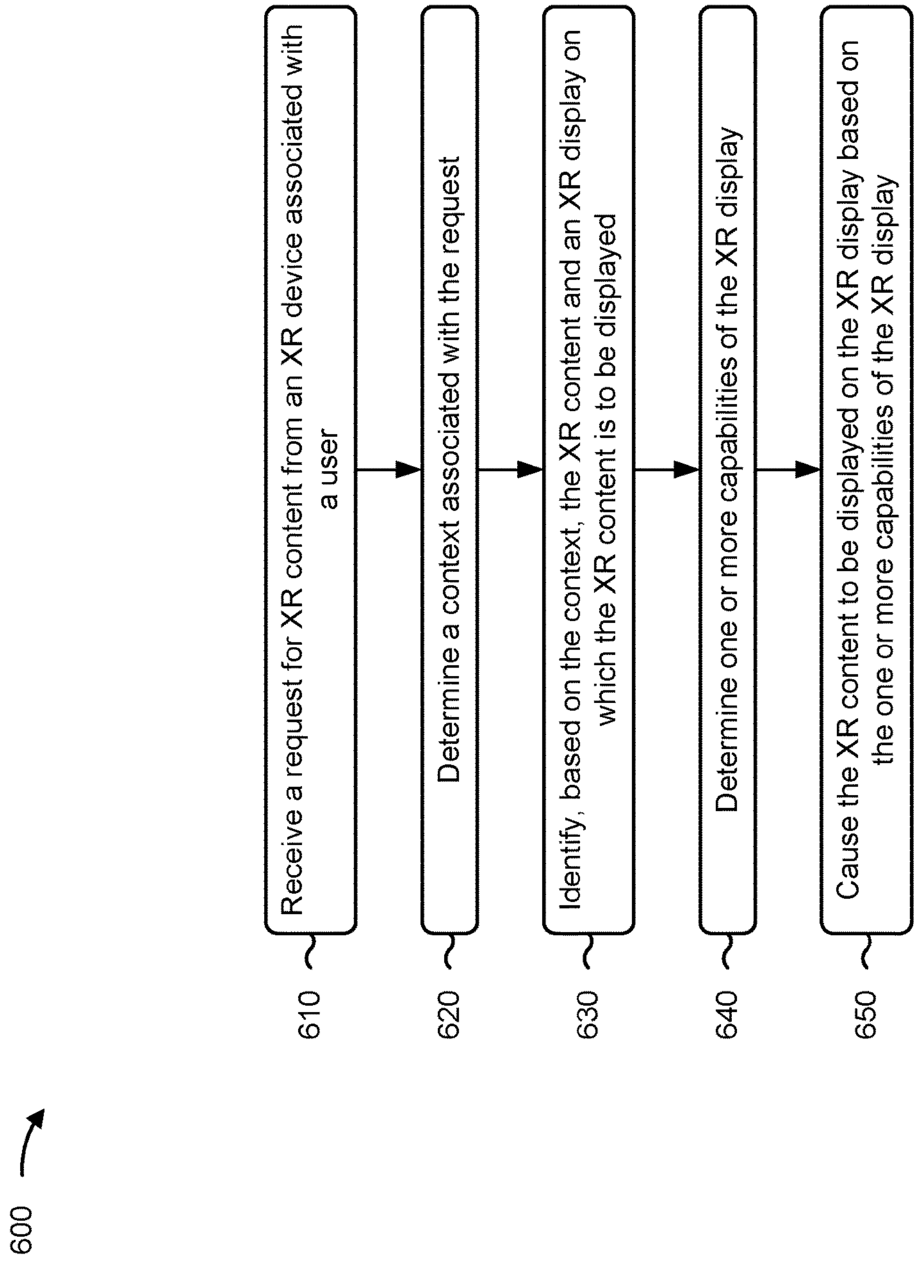
FIG. 6 is a flowchart of an example process associated with displaying XR content based on a context.

FIG. 6 is a flowchart of an example process 600 associated with displaying XR content based on a context. In some implementations, one or more process blocks of FIG. 6 are performed by an XR platform (e.g., XR platform 102, device 400). In some implementations, one or more process blocks of FIG. 6 are performed by another device or a group of devices separate from or including the XR platform, such as an XR device (e.g., XR device 104), an XR display (e.g., XR display 116, XR display 116*a*, XR display 116*b*). Additionally, or alternatively, one or more process blocks of FIG. 6 may be performed by one or more components of device 400, such as processor 420, memory 430, input component 440, output component 450, and/or communication component 460.

As shown in FIG. 6, process 600 may include receiving a request for XR content from an XR device associated with a user (block 610). For example, the XR platform 102 may receive a request for XR content from an XR device 104 associated with a user, as described herein.

As further shown in FIG. 6, process 600 may include determining a context associated with the request (block 620). For example, the XR platform 102 may determine a context associated with the request, as described herein.

As further shown in FIG. 6, process 600 may include identifying, based on the context, the XR content and an XR display on which the XR content is to be displayed (block 630). For example, the XR platform 102 may identify, based on the context, the XR content and an XR display (e.g., XR display 116, XR display 116*a*, XR display 116*b*) on which the XR content is to be displayed, as described herein.

As further shown in FIG. 6, process 600 may include determining one or more capabilities of the XR display (block 640). For example, the XR platform 102 may determine one or more capabilities of the XR display, as described herein.

As further shown in FIG. 6, process 600 may include causing the XR content to be displayed on the XR display based on the one or more capabilities of the XR display (block 650). For example, the XR platform 102 may cause the XR content to be displayed on the XR display based on the one or more capabilities of the XR display, as described herein.

Process 600 may include additional implementations, such as any single implementation or any combination of implementations described below and/or in connection with one or more other processes described elsewhere herein.

In a first implementation, process 600 includes determining that one or more other users are located in a surrounding area of the XR display, and determining that the one or more other users are authorized to view the XR content, wherein the one or more processors, to cause the XR content to be displayed on the XR display, are configured to causing the XR content to be displayed on the XR display based on determining that the one or more other users are authorized to view the XR content.

In a second implementation, alone or in combination with the first implementation, process 600 includes determining that the one or more other users are authorized to view the XR content based on user profiles associated with the one or more other users and stored in a data repository 110 of the XR platform 102.

In a third implementation, alone or in combination with one or more of the first and second implementations, process 600 includes determining that one or more other users are located in a surrounding area of the XR display, determining that the one or more other users are authorized to view the XR content, and causing the XR content to be displayed on one or more personal XR displays, associated with the one or more other users, based on determining that the one or more other users are authorized to view the XR content.

In a fourth implementation, alone or in combination with one or more of the first through third implementations, process 600 includes determining that one or more other users are located in a surrounding area of the XR display, determining that the one or more other users are authorized to view the XR content, determining that the one or more other users do not have access to personal XR displays, and causing the XR content to be displayed on a multi-user XR display based on determining that the one or more other users are authorized to view the XR content and do not have access to personal XR displays.

In a fifth implementation, alone or in combination with one or more of the first through fourth implementations, process 600 includes determining that one or more other users are located in a surrounding area of the XR display, determining that a subset of the one or more other users are authorized to view the XR content, and causing the XR content to be displayed on personal XR displays, associated with the subset of the one or more other users, based on determining that the subset of the one or more other users are authorized to view the XR content.

In a sixth implementation, alone or in combination with one or more of the first through fifth implementations, process 600 includes determining that one or more other users are located in a surrounding area of the XR display, determining an authorization level of the one or more other users, and causing the XR content to be displayed on a multi-user XR display based on determining that the one or more other users are authorized to view the XR content and do not have access to personal XR displays, wherein the XR content satisfies the authorization level of the one or more other users.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
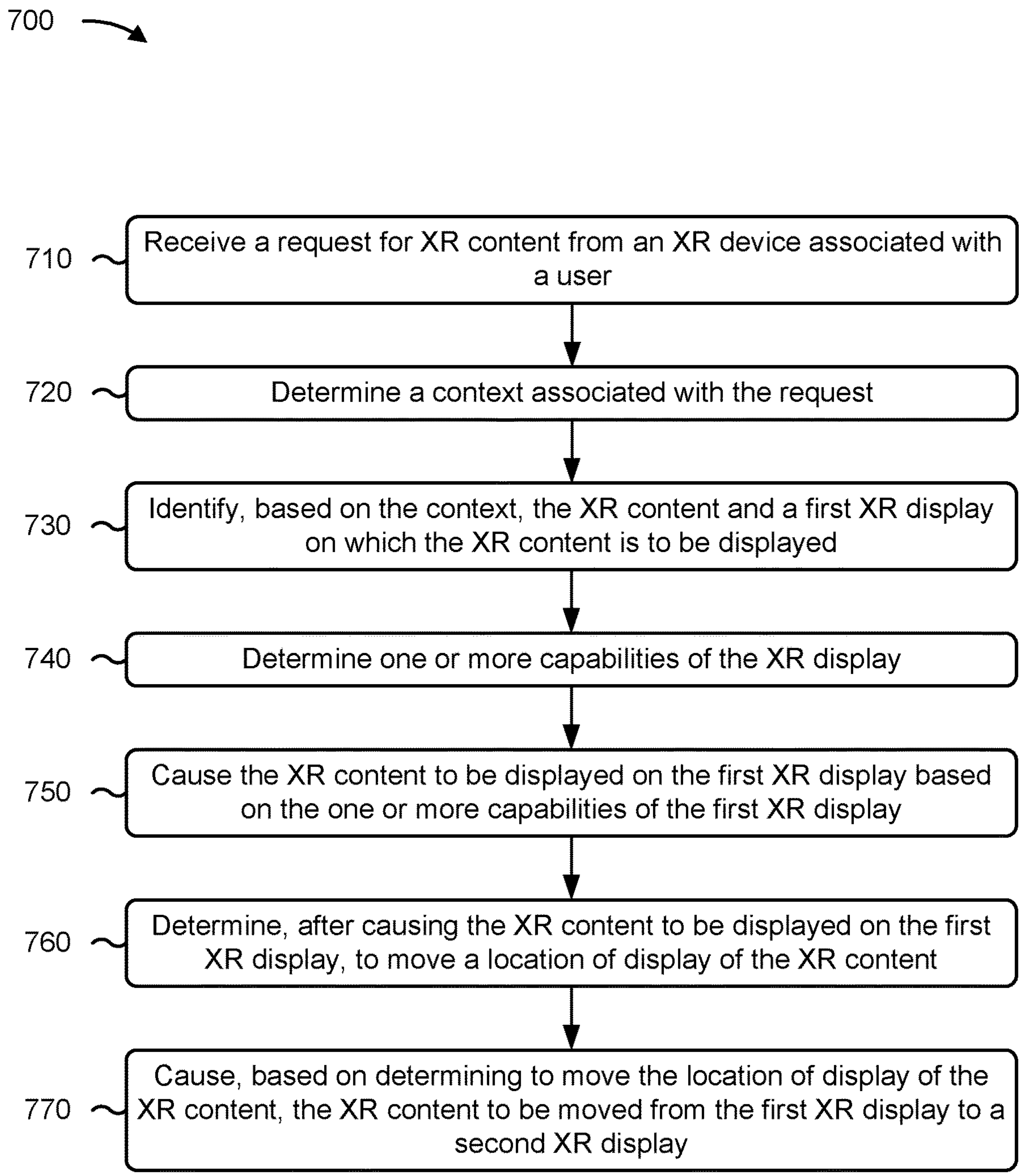
FIG. 7 is a flowchart of an example process associated with displaying XR content based on a context.

FIG. 7 is a flowchart of an example process 700 associated with displaying XR content based on a context. In some implementations, one or more process blocks of FIG. 7 are performed by an XR platform (e.g., XR platform 102, device 400). In some implementations, one or more process blocks of FIG. 7 are performed by another device or a group of devices separate from or including the XR platform, such as an XR device (e.g., XR device 104), an XR display (e.g., XR display 116, XR display 116*a*, XR display 116*b*). Additionally, or alternatively, one or more process blocks of FIG. 7 may be performed by one or more components of device 400, such as processor 420, memory 430, input component 440, output component 450, and/or communication component 460.

As shown in FIG. 7, process 700 may include receiving a request for XR content from an XR device associated with a user (block 710). For example, the XR platform 102 may receive a request for XR content from an XR device 104 associated with a user, as described herein.

As further shown in FIG. 7, process 700 may include determining a context associated with the request (block 720). For example, the XR platform 102 may determine a context associated with the request, as described herein.

As further shown in FIG. 7, process 700 may include identifying, based on the context, the XR content and a first XR display on which the XR content is to be displayed (block 730). For example, the XR platform 102 may identify, based on the context, the XR content and a first XR display (e.g., XR display 116, XR display 116*a*, XR display 116*b*) on which the XR content is to be displayed, as described herein.

As further shown in FIG. 7, process 700 may include determining one or more capabilities of the XR display (block 740). For example, the XR platform 102 may determine one or more capabilities of the XR display, as described herein.

As further shown in FIG. 7, process 700 may include causing the XR content to be displayed on the first XR display based on the one or more capabilities of the first XR display (block 750). For example, the XR platform 102 may cause the XR content to be displayed on the first XR display based on the one or more capabilities of the first XR display, as described herein.

As further shown in FIG. 7, process 700 may include determining, after causing the XR content to be displayed on the first XR display, to move a location of display of the XR content (block 760). For example, the XR platform 102 may determine, after causing the XR content to be displayed on the first XR display, to move a location of display of the XR content, as described herein.

As further shown in FIG. 7, process 700 may include causing, based on determining to move the location of display of the XR content, the XR content to be moved from the first XR display to a second XR display (block 770). For example, the XR platform 102 may cause, based on determining to move the location of display of the XR content, the XR content to be moved from the first XR display to a second XR display (e.g., XR display 116, XR display 116*a*, XR display 116*b*), as described herein.

Process 700 may include additional implementations, such as any single implementation or any combination of implementations described below and/or in connection with one or more other processes described elsewhere herein.

In a first implementation, process 700 includes determining to move the location of display of the XR content based on another request received from the XR device 104.

In a second implementation, alone or in combination with the first implementation, the other request indicates the second XR display, and wherein the one or more instructions, that cause the one or more processors to cause the XR content to be moved from the first XR display to the second XR display, cause the one or more processors to causing the XR content to be moved from the first XR display to the second XR display based on the second XR display being indicated in the other request.

In a third implementation, alone or in combination with one or more of the first and second implementations, process 700 includes determining the second XR display based on historical movement data associated with the user.

In a fourth implementation, alone or in combination with one or more of the first through third implementations, process 700 includes determining the second XR display using the historical movement data in a machine learning model and/or artificial intelligence.

In a fifth implementation, alone or in combination with one or more of the first through fourth implementations, process 700 includes determining to move the location of display of the XR content based on identifying an obstruction of the first XR display.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

In this way, the XR platform described herein analyzes XR content to determine one or more parameters for displaying the XR content. The XR platform may receive a request to display XR content from an XR device associated with a user. The XR platform may determine the one or more display parameters based on a context associated with the XR device and/or the user of the XR device. This enables security for XR content to be maintained by determining whether the XR content can be displayed on an XR device in a secure environment. Moreover, this enables processing and memory resources of an XR device to be conserved by refraining from displaying XR content that is created for viewing by multiple concurrent users if the XR device can only support viewing by a single concurrent user. Further, refraining from causing XR content to be displayed on an XR display based on determining that as user of the XR device is not currently viewing an XR display of the XR device conserves processing and memory resources of the XR device that would otherwise be wasted on displaying XR content that is not viewed by a user. Moreover, this conserves processing and memory resources of the XR device that would otherwise be wasted on redisplaying the XR content when the user is actually viewing the XR display. In addition, if the XR platform determines that XR content is not to be displayed at a particular time due to the user the context associated with the XR device, the XR platform may use machine learning and/or AI to determine a subsequent time at which to display the XR content. This conserves processing, memory, and/or networking resources of the XR device in that the XR device does not need to generate and transmit subsequent requests for display of the XR content to the XR platform.

As described in greater detail above, some implementations described herein provide a method. The method includes receiving, by an XR platform, a request for XR content. The method includes determining, by the XR platform and based on the request, a context, where the context is associated with at least one of an XR device, a user associated with the XR device, or an XR display associated with the XR device. The method includes determining, by the XR platform and based on the context, one or more display parameters for displaying the XR content on the XR display. The method includes causing, by the XR platform, the XR content to be displayed on the XR display based on the one or more display parameters.

As described in greater detail above, some implementations described herein provide an XR platform. The XR platform includes one or more memories. The XR platform includes one or more processors communicatively coupled to the one or more memories. The one or more processors are configured to receive a request for XR content from an XR device associated with a user. The one or more processors are configured to determine a context associated with the request. The one or more processors are configured to identify, based on the context, the XR content and an XR display on which the XR content is to be displayed. The one or more processors are configured to determine one or more capabilities of the XR display. The one or more processors are configured to cause the XR content to be displayed on the XR display based on the one or more capabilities of the XR display.

As described in greater detail above, some implementations described herein provide a non-transitory computer-readable medium that stores a set of instructions. The set of instructions includes one or more instructions that, when executed by one or more processors of an XR platform, cause the XR platform to receive a request for XR content from an XR device associated with a user. The set of instructions includes one or more instructions that, when executed by one or more processors of an XR platform, cause the XR platform to determine a context associated with the request. The set of instructions includes one or more instructions that, when executed by one or more processors of an XR platform, cause the XR platform to identify, based on the context, the XR content and a first XR display on which the XR content is to be displayed. The set of instructions includes one or more instructions that, when executed by one or more processors of an XR platform, cause the XR platform to determine one or more capabilities of the XR display. The set of instructions includes one or more instructions that, when executed by one or more processors of an XR platform, cause the XR platform to cause the XR content to be displayed on the first XR display based on the one or more capabilities of the first XR display. The set of instructions includes one or more instructions that, when executed by one or more processors of an XR platform, cause the XR platform to determine, after causing the XR content to be displayed on the first XR display, to move a location of display of the XR content. The set of instructions includes one or more instructions that, when executed by one or more processors of an XR platform, cause the XR platform to cause, based on determining to move the location of display of the XR content, the XR content to be moved from the first XR display to a second XR display.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

receiving, by an extended reality (XR) platform and from an XR device, a request for XR content and associated with a first user;

determining, by the XR platform, based on the request, and via one or more sensors of the XR device, a presence of one or more second users, different from the first user, in a surrounding area of a multi-user XR display;

determining, by the XR platform and based on the presence of the one or more second users, a context associated with the XR content, wherein the context includes information identifying the one or more second users viewing the multi-user XR display;

determining, by the XR platform and based on the context and user profiles, one or more display parameters for displaying the XR content, wherein the user profiles are associated with the first user and the one or more second users; and causing, by the XR platform, the XR content to be displayed on a personalized XR display of the first user or the multi-user XR display based on the one or more display parameters.

2. The method of claim 1, wherein the context includes information identifying at least one of:

a location of the XR device, or a location of the multi-user XR display.

3. The method of claim 1, wherein the context includes information identifying at least one of:

whether the first user is viewing the multi-user XR display, whether the XR device is in motion or at rest, or an orientation of the XR device.

4. The method of claim 1, wherein the one or more display parameters comprise a security level of the XR content.

5. The method of claim 1, wherein determining the one or more display parameters comprises:

determining, based on the user profiles, respective authorization levels for the first user and the one or more second users; and determining based on the context and the respective authorization levels, the one or more display parameters for displaying the XR content.

6. The method of claim 5, further comprising:

determining, based on the respective authorization levels, an XR display type of the XR display for displaying the XR content.

7. The method of claim 1, wherein the context includes information identifying a location of the one or more second users and a location of the multi-user XR display.

8. An extended reality (XR) platform, comprising:

one or more memories; and one or more processors, coupled to the one or more memories, configured to:

receive, from an XR device, a request for XR content associated with a first user;

determine, based on the request and via one or more sensors of the XR device, a presence of one or more second users, different from the first user, in a surrounding area of a multi-user XR display;

determine, based on the presence of the one or more second users, a context associated with the XR content, wherein the context includes information identifying the one or more second users viewing the multi-user XR display;

identify, based on the context, the XR content and a first personalized XR display of the first user;

determine one or more capabilities of the first personalized XR display;

determine, based on one or more user profiles associated with the one or more second users, whether the one or more second users are authorized to view the XR content; and cause the XR content to be displayed on the first personalized XR display or the multi-user XR display based on the one or more capabilities of the XR display and whether the one or more second users are authorized to view the XR content.

9. The XR platform of claim 8, wherein one or more processors are further configured to:

determine whether the one or more second users have access to one or more second personal XR displays, wherein the XR content is caused to be displayed on the first personalized XR display or the multi-user XR display further based on whether the one or more second users have access to the one or more second personal XR displays.

10. The XR platform of claim 8, wherein one or more processors, to determine whether the one or more second users are authorized to view the XR content, are configured to:

determine that a subset of the one or more second users are authorized to view the XR content, and cause the XR content to be displayed on one or more second personal XR displays, associated with the subset of the one or more second users, based on determining that the subset of the one or more second users are authorized to view the XR content, wherein the XR content is caused to be displayed on the first personalized XR display.

11. The XR platform of claim 8, wherein one or more processors, to determine whether the one or more second users are authorized to view the XR content, are configured to:

determine, based on the one or more user profiles, one or more authorization levels of the one or more second users; and determine, based on the one or more authorization levels, whether the one or more second users are authorized to view the XR content.

12. The XR platform of claim 8, wherein the context includes information identifying a location of the one or more second users and a location of the multi-user XR display.

13. A non-transitory computer-readable medium storing a set of instructions, the set of instructions comprising:

one or more instructions that, when executed by one or more processors of an extended reality (XR) platform, cause the XR platform to:

receive a request for XR content from an XR device associated with a first user;

determine a context associated with the request;

identify, based on the context, the XR content and a first XR display;

determine one or more capabilities of the XR display;

cause the XR content to be displayed on the first XR display based on the one or more capabilities of the first XR display;

determine, after causing the XR content to be displayed on the first XR display, that one or more second users are distracted from the XR content being displayed on the first XR display:

determine, based on determining that the one or more second user are distracted from the XR content being displayed on the first XR display, to move a location of display of the XR content; and cause, based on determining to move the location of display of the XR content, the XR content to be moved from the first XR display to a second XR display, wherein the second XR display is at a second location different from the location of the display of the XR content.

14. The non-transitory computer-readable medium of claim 13, wherein the one or more instructions, that cause the one or more processors to determine to move the location of display of the XR content, cause the one or more processors to:

determine to move the location of display of the XR content based on another request received from the XR device.

15. The non-transitory computer-readable medium of claim 14, wherein the other request indicates the second XR display; and wherein the one or more instructions, that cause the one or more processors to cause the XR content to be moved from the first XR display to the second XR display, cause the one or more processors to:

cause the XR content to be moved from the first XR display to the second XR display based on the second XR display being indicated in the other request.

16. The non-transitory computer-readable medium of claim 15, wherein the one or more instructions, when executed by the one or more processors, cause the one or more processors to:

determine the second XR display, from a plurality of XR displays different from the first XR display, based on historical movement data associated with the first user.

17. The non-transitory computer-readable medium of claim 16, wherein the one or more instructions, that cause the one or more processors to determine the second XR display, cause the one or more processors to:

determine the second XR display using at least one of artificial intelligence or the historical movement data in a machine learning model.

18. The non-transitory computer-readable medium of claim 13, wherein the one or more second users are determined to be distracted from the XR content being displayed on the first XR display using or more sentiment analysis techniques.

19. The non-transitory computer-readable medium of claim 13, wherein the second XR display is a personalized XR display for each of the one or more second users.

20. The non-transitory computer-readable medium of claim 13, wherein the second XR display is at a multi-user XR display for the one or more second users.

* * * * *